UNITED STATES PATENT OFFICE.

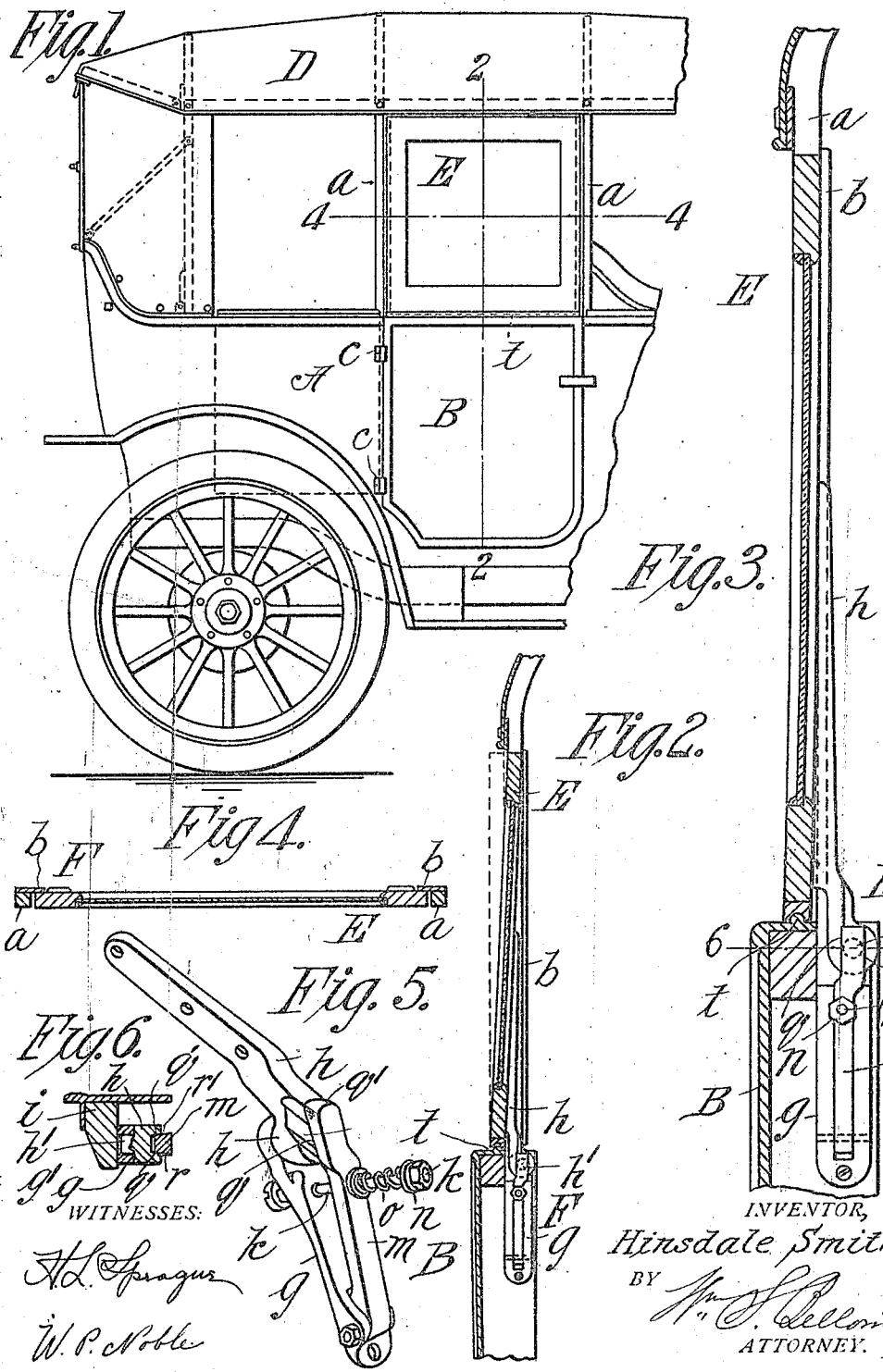

HINSDALE SMITH, OF SPRINGFIELD, MASSACHUSETTS, ASSIGNOR TO THE SPRINGFIELD BODY COMPANY, OF SPRINGFIELD, MASSACHUSETTS, A CORPORATION OF MASSACHUSETTS.

CONVERTIBLE VEHICLE-BODY.

1,170,571.   Specification of Letters Patent.   Patented Feb. 8, 1916.

Application filed January 13, 1913. Serial No. 741,732.

*To all whom it may concern:*

Be it known that I, HINSDALE SMITH, a citizen of the United States of America, and resident of Springfield, in the county of Hampden and State of Massachusetts, have invented certain new and useful Improvements in Convertible Vehicle-Bodies, of which the following is a full, clear, and exact description.

This invention relates to vehicle bodies and is more particularly designed for employment in a body for an automobile which is so convertible in character that it may be utilized as a closed vehicle resembling a limousine or landaulet, or used as an open touring car.

The invention includes the novel combination and arrangement of a vehicle body proper having a door opening and a door therefor, hinged to the body, and a suitable window stop above the door opening; a window hinge connected on a horizontal pivot-axis to an upper portion of the door at a point transversely located relatively to such upper door portion whereby the window while swung upwardly on its hinge and on being bodily moved with the closing door will contact at its upper portion against the stop causing a slight swinging motion of the window relatively to the door such as to produce a tightening of the lower edge of the window against the top of the door for the exclusion of dust, moisture or water and for anti-rattling effects.

The convertible body of the character to which this invention pertains is illustrated in an application for Letters Patent of the United States filed by me Feb. 20, 1911, No. 609,564, such body being characterized in part by the inclusion of a foldable top comprising a plurality of bows, the separated depending side members of which form or support the window stop which constitutes an important provision in the present improvements.

The invention is described in conjunction with the accompanying drawings and is set forth in the claims.

In the drawings:—Figure 1 is a side elevation of a portion of the convertible automobile body showing a window as in its elevated position in upward continuation with the window side door. Fig. 2 is a cross sectional view, on a somewhat larger scale than that of Fig. 1, on line 2—2, thereon, the door being understood as having the position not quite fully closed within the body. Fig. 3 is a view similar to Fig. 2 but on a still further enlarged scale, showing the relations of the parts when the door is completely closed in the body. Fig. 4 is a cross sectional view on line 4—4, Fig. 1. Fig. 5 is a perspective view of a construction of spring hinge which is here particularly applicable.

In the drawings, A represents a portion of an automobile body of which one of the doors B thereof is hinged at $c$ $c$ to swing outwardly as usual; and D represents a portion of the top comprising a plurality of bows, certain of which when the top is up have their lower ends detachably secured to the body to form vertical upright continuations of the body in lines with the vertical boundaries of the door opening.

The window E, the glass portion of which is held in a sufficiently substantial sash is connected to an upper portion of the door by a pair of hinges F F so that the window may be swung downwardly on the inner side of the door or swung upwardly to an upright position between the bows and as a continuation of the door. The particular form of hinge here employed as having entire fitness for the purpose is included in the subject matter of an application for Letters Patent of the United States filed by me May 11, 1911, Serial No. 626,735, the same being here illustrated in the perspective view, and it will be briefly described as follows:—Each hinge consists of a door attachment member $g$ and a window attachment member $h$, such members being pivotally connected at $h'$; a bar $m$ having the lower portion thereof pivoted to the door attachment member and arranged offset from and substantially parallel with such member for a swinging movement toward and away therefrom, and at right angles to the axis of swinging movement of the window attachment member,—such bar, with a portion of the window attachment member adjacent its pivot having, the one a channel with inwardly converging walls $q$, $q'$, and the other a locking portion having tapering sides $r$ $r'$ for an engagement in the channel;—a rod $k$ rigidly supported by the door attachment member and extending loosely through and beyond the pivot bar *m* having a shoulder *n* at its outer end; and a spring *o* encircling said rod and in compression between the shoulder *n* and the bar *m*.

The bows *a a* have the jamb strips *b b* which make the window stops, their locations being in a plane coincident with or adjacent the inner face of the door.

The upper edge of the door as shown is provided with an upstanding rib *t*, and it is to be noted that the pivot-axis *h* of the duplicated hinges F are on a line inside of and transversely from the upper portion of the door. It is also to be understood that each hinge F is of such character that when the window is swung upwardly, as shown in Fig. 2,—the portion of the bar having the beveled faces *r r'* bottoming into the recess having the convergent faces *q q'* in the portion of the window attachment member *h*,—the window instead of being yieldingly held in an absolutely vertical position will be held slightly upwardly and inwardly inclined. The conditions or relations of the parts last mentioned are such as prevail when the door is almost, but not quite, swung inwardly into the door opening to be fastened by the usual door lock; and it will be perceived that the lower edge of the window has a clearance or slight separation from the upper edge of the door, and also that the upper inner corner, where the rear face and top edge of the sash meet, acquires a bearing against the window stop or jamb strips at the inner sides of the depending members of the bows comprised in the foldable top. Now referring to Fig. 3, in comparison with Fig. 2, it is here understood that the door B has been forced to its fully closed position and locked, or in readiness to be confined, by the usual door lock or latch. In the forcing action of the parts from the position shown in Fig. 2 to that of Fig. 3, the upper portion of the window sash being resisted by the stop or jamb strips and the hinge axis being invariable, the window necessarily has a motion and action similar to that of the member of a toggle with the result that the lower edge of the window sash is crowded tightly against the top edge of the door for the exclusion of dust, moisture, air or water; and the door lock holding the parts in the last stated positions and relations insures an avoidance of any rattling or lost motion between the sash and the parts against which it is in pressure bearing.

The rib or bead having its position along and upstanding above the top edge of the door is preferably composed of rubber, felt, or like compressible material so as to accommodate, by compression, more or less to the downward movement of the sash which is derived by the latter in the last stage of the door closing action; but this bead or rib might be of brass or other non-compressible material without defeating or detracting from the operativeness and efficiency of my arrangement, because in the forcible complete closing of the door after the top of the sash had come to contact with the window stop, the stress on the sash would be sufficient to cause the window to become slightly convex as permitted by the flexible character of the latter and its consequent susceptibility of being slightly, although sufficiently sprung from its normal plane condition; or, again, the bows might be of such yielding character as to permit the accommodation of the parts one to the other in the door closing action.

The spring hinge shown in Fig. 5 and hereinabove referred to, is of such construction and capability that when the window, by inversion is folded down closely against the inside of the door, the engagement of the nose or tapered member of the spring-pressed bar *m* in the channel between the convergent faces *q, q'*, is effective to prevent the window from flapping or swinging on its hinge.

In order to swing the window from its folded down position at the inside of the door to the position slightly inclined from the vertical shown in Fig. 2, it is necessary to quite widely open the door; and when the window is swung to the last mentioned position, it is there retained by the detent action of the engagement faces *r r'* and *q, q'*, so that the window when bodily swung inwardly in unison with the door, will not topple inwardly and downwardly; and it is to be explained that when the window derives its secondary motion for making the tight closure in the final stage of the door closing action, the bevel faced nose is by the force of the door-closing action, crowded out of its bottoming detent engagement in the channel having the convergent faces, it being appreciated that the door closing force greatly exceeds the resistance of the spring *o* included in the hinge.

While the spring hinge hereinabove referred to has been devised for employment in conjunction with the parts of a convertible vehicle body, and is better suited for such use than any other construction of hinge known to me, the same, nevertheless, forms no part of the present invention and the latter is not necessarily dependent upon the employment of this special hinge.

I claim:—

1. The combination with a vehicle body having a top provided with a window stop above the body proper, and having a door opening, a door therefor, hinged to the body, of a window jointed on a horizontal pivot-axis to an upper portion of the door at a point without the plane of the door, and spring means for yieldingly supporting the window in a slightly upwardly and inwardly inclined position relatively to the vertical plane of the door, the arrangement being such that just previous to the complete closing of the door the upper portion of the inwardly inclined window will acquire contact against said window stop.

2. The combination with an automobile body having a door opening and a door therefor, hinged to the body, and a window stop above the door opening, of a window hinge-connected on a horizontal pivot-axis to an upper portion of the door at a point without the plane of the door, whereby the window while in its upwardly swung position and on being bodily moved with the closing door will contact at its upper portion against the stop causing a swinging motion of the window relatively to the door and a movement of the lower edge of the window toward and for tightly closing against the top of the door, the said device comprising a resilient member, whereby the parts on being brought to their coöperative relations may yield for the accommodation of one to another thereof.

3. The combination with an automobile body having a door opening and a door therefor hinged to the body, a window stop above the door opening, said door having a hinged upper portion, in advance of the lower portion and yieldingly held in such position until the door is forced against the stop thereby forcing the upper section of the door into alinement with the lower section.

4. The combination with an automobile body having a door opening and a sectional door therefor hinged to the body, a window stop adjacent the door opening, said door having one section thereof in advance of the remaining section and yieldingly held in such position until the door is closed when the first mentioned section is forced into alinement with the said remaining section.

5. The combination with an automobile body having a door opening and a door therefor hinged to the body, a window stop adjacent the door opening, said door being divided into an upper and lower section, means associated with the meeting edges of the sections for excluding dust, the door having the upper section in advance of the lower section and yieldingly held in such position until the door is closed against said stop thereby forcing the upper section into alinement with the lower section.

6. The combination with an automobile body having a door opening and a door therefor hinged to the body, a window stop adjacent the door opening, said door being divided into an upper and lower section, yielding means associated with the meeting edges of the sections for excluding dust, the door having the upper section in advance of the lower section and yieldingly held in such position until the door is closed when the upper section will be swung into alinement with the lower section.

7. In a device of the character described consisting of an automobile body having a door opening and a door therefor hinged to the body, a window stop adjacent the door opening, said door comprising an upper and lower section, means associated with the sections for causing a toggle movement of the upper section when the door contacts with the stop on being closed and thereby effecting a tightly fitting joint between the sections.

Signed by me at Springfield, Mass., in presence of two subscribing witnesses.

HINSDALE SMITH.

Witnesses:
WM. S. BELLOWS,
G. R. DRISCOLL.